United States Patent [19]

Weider et al.

[11] Patent Number: 5,693,697
[45] Date of Patent: Dec. 2, 1997

[54] FLAME-RESISTANT POLYCARBONATE MOULDING-COMPOSITIONS

[75] Inventors: Richard Weider, Leverkusen; Klaus Horn, Dormagen; Klaus Berg, Krefeld, all of Germany

[73] Assignee: Bayer Aktiengesellschaft, Germany

[21] Appl. No.: 552,627

[22] Filed: Nov. 3, 1995

[30] Foreign Application Priority Data

Nov. 15, 1994 [DE] Germany ............ 44 40 684.3

[51] Int. Cl.⁶ .................. C08K 5/54; C08K 3/40
[52] U.S. Cl. .................. 524/262; 524/261; 524/263; 524/265; 524/494
[58] Field of Search .................. 524/262, 261, 524/263, 265, 494

[56] References Cited

U.S. PATENT DOCUMENTS

| | | | |
|---|---|---|---|
| 2,999,835 | 9/1961 | Goldberg | 524/267 |
| 3,742,083 | 6/1973 | Bialous | 524/267 |
| 3,742,085 | 6/1973 | Bialous | 525/101 |
| 3,775,367 | 11/1973 | Nouverné | 524/165 |
| 3,836,490 | 9/1974 | Bockman et al. | 524/388 |
| 4,335,038 | 6/1982 | Thomas | 524/188 |
| 4,375,525 | 3/1983 | Idel et al. | 524/108 |
| 4,804,692 | 2/1989 | Lundy et al. | 523/137 |
| 4,954,549 | 9/1990 | Lewis et al. | 524/264 |

FOREIGN PATENT DOCUMENTS

| | | |
|---|---|---|
| 0 019 212 | 11/1980 | European Pat. Off. . |
| 392 252 | 10/1990 | European Pat. Off. . |
| 505 869 | 9/1992 | European Pat. Off. . |
| 507 178 | 10/1992 | European Pat. Off. . |
| 25 35 261 | 2/1976 | Germany . |
| 25 10 463 | 9/1976 | Germany . |
| 27 44 016 | 4/1978 | Germany . |
| 29 18 882 | 11/1980 | Germany . |
| 29 18 883 | 11/1980 | Germany . |
| 29 20 451 | 1/1981 | Germany . |
| 35 00 807 | 7/1985 | Germany . |
| 39 33 545 | 4/1991 | Germany . |
| 41 19 329 | 12/1992 | Germany . |
| 41 27 079 | 1/1993 | Germany . |
| 1 370 744 | 10/1974 | United Kingdom . |

OTHER PUBLICATIONS

Chem. Abstr. 122:316110 (1995); no JP document Eng. Abs. only.
JA 60 149657 (Jan. 13, 1984) Eng abs only; no JP patent.
JA 60 149658 (Jan. 13, 1984) Eng abs only; no JP patent.
JA 60 186559 (Mar. 6, 1984) Eng abs. only; no JP patent.

*Primary Examiner*—Vasu S. Jagannathan
*Assistant Examiner*—John J. Guarriello
*Attorney, Agent, or Firm*—Connolly and Hutz

[57] ABSTRACT

The present invention provides flame-resistant polycarbonate moulding compositions with a concentration of alkali metal or alkaline earth metal salts and of silicon compounds and their preparation.

6 Claims, No Drawings

FLAME-RESISTANT POLYCARBONATE MOULDING-COMPOSITIONS

The present invention provides polycarbonate moulding compositions with a concentration
a) of alkali metal or alkaline earth metal salts of inorganic protonic acids and/or organic Brönsted acids with at least one carbon atom, preferably without elements from the group consisting of chlorine, bromine and phosphorus, in amounts of 0.001 wt. % to 1 wt. %, preferably in amounts of 0.1 wt. % to 0.7 wt. % and in particular of 0.1 wt. % to 0.5 wt. % and
b) of silicon compounds of the formula (I)

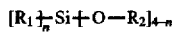

in which $R_1$ is a $C_6-C_{20}$-alkyl (linear or branched), $C_6-C_{12}$-cycloalkyl or alkylcycloalkyl, $C_6-C_{10}$-aryl or $C_7-C_{13}$-aryl-alkyl group, preferably a $C_8-C_{18}$-alkyl (linear or branched), $C_6-C_{12}$-cycloalkyl or alkylcycloalkyl, phenyl or $C_1-C_3$-phenyl-alkyl group, in particular a $C_8-C_{18}$-alkyl (linear or branched), phenyl or $C_1-C_3$-phenyl-alkyl group, $R_2$ represents a $C_1-C_{18}$-alkyl (linear or branched), $C_6-C_{12}$-cycloalkyl or alkylcycloalkyl or $C_7-C_{13}$-aryl-alkyl group, preferably a $C_1-C_4$-alkyl (linear or branched) or $C_1-C_3$-phenyl-alkyl group, in particular a $C_1-C_4$-alkyl (linear or branched) group, n represents an integer from 1 to 3, preferably 1 to 2 and if there are several $R_1$ or $R_2$ groups, these may be identical or different groups from the relevant range of definitions, in amounts of 0.01 wt. % to 10 wt. %, preferably 0.1 wt. % to 5 wt. %, in particular 0.2 wt. % to 3 wt. %, each being with respect to the weight of polycarbonate for both component a) and component b).

The addition of polysiloxanes to polycarbonates has been known for some time (see, for example, U.S. Pat. No. 2,999,835). Flame-resistance is not mentioned in this case, but rather mould release and processing (column 7, lines 16 to 27 in U.S. Pat. No. 2,999,835).

The addition of alkali metal salts to produce flame-resistant polycarbonates has also been known for some time (see, for example, DE-OS 1 930 257 (Le A 12 278) and U.S. Pat. No. 3,775,367, DE-OS 2 049 358 (Le A 13 263) and U.S. Pat. No. 3,836,490 and DE-OS 2 149 311 (Le A 13 999) and GB-PS 1 370 744).

DE-OS 2 535 261 discloses the preparation of flame-resistant polycarbonates, wherein organic alkali metal salts or organic alkaline earth metal salts or mixtures of the same are added together with siloxanes.

EP-A2-0 392 252 (Le A 26 733) discloses flame-resistant polycarbonates, both alkali metal and alkaline earth metal salts and also siloxanes acting as flame retardants (see page 3, line 8 et seq. and line 35).

The oligomeric or polymeric siloxanes described there lead to considerable cloudiness, even in very small amounts, which excludes use for highly transparent moulded articles. When using oligomeric or polymeric siloxanes, it is also known that volatile cyclic siloxanes form in the finished part due to cleavage and this can lead to contact damage in electrical equipment.

DE-OS 2 744 016 also discloses flame retardant polycarbonates which contain organic alkali metal salts, organic alkaline earth metal salts or mixtures thereof and alkali metal or alkaline earth metal halides or organic halides. In addition, a siloxane may be included, which improves the flame-resistance (claim 15 in the DE-OS).

The oligomeric and polymeric siloxanes described there are only effective in combination with an organic halide (see example L', M', N' in the patent specification mentioned above) and, when used simply in combination with a salt, lead to a deterioration in the burning properties (example V, M').

DE-OS 2 918 882 (Le A 19 568) describes flame-resistant thermoplastics mixtures which contain halogenated organic compounds, alkali metal or alkaline earth metal salts and an antidrip agent, polysiloxanes also being suitable for this purpose.

DE-OS 2 918 883 (Le A 19 569) also describes flame-resistant thermoplastics mixtures which contain halogenated organic compounds, alkali metal or alkaline earth metal salts and an antidrip agent, polysiloxanes again also being suitable for this purpose.

The polysiloxanes mentioned here are the same compounds as mentioned in DE-OS 2 535 261.

U.S. Pat. No. 3,742,083 and U.S. Pat. No. 3,742,085 describe the combination of a salt and a siloxane as an additive for polycarbonates for a different purpose, this being thermal stabilisation.

There are a number of references in the literature which take account of the addition of Si compounds, where it is mentioned, however, that flameproofing agents may generally be added (see for example DE-OS 2 510 463 (LeA 16 231), DE-OS 2 920 450 (Le A 19 566) or U.S. Pat. No. 4,375,525, DE-OS 2 920 451 (Le A 16 231), DE-OS 3 933 545 (Le A 27 209), EP-A2-0 505 869 (Le A 28 228 +Le A 28 445) and EP-A2-0 507 178 (Le A 28 232)).

These references in the literature also refer to thermal stabilisation by means of Si compounds.

The addition of structurally similar Si compounds is disclosed in U.S. Pat. No. 4,804,692 (Mo 3005), DE-OS 4 119 329 (Le A 28 242) and DE-OS 4 127 079 (Le A 28 605).

Here, Si compounds are used to stabilise polycarbonates against the effects of γ-rays. Flameproofing is not mentioned.

JA-60-149 657 (currently, only the abstract has been translated) discloses polycarbonate resins which contain potassium phosphonates, aromatic phosphites and Si compounds, the polycarbonates being free of halogen substituents. $CH_3$—Si—$(O$-nonyl$)_3$ is mentioned as a Si compound.

The polycarbonate resins treated in this way are flame-resistant and can be processed without discolouring and without lowering the molecular weight.

JA-60-149 658 (currently, only the abstract has been translated) discloses polycarbonate resins which contain potassium phosphates, aromatic phosphites, Si compounds and glass fibres.

The polycarbonates have improved flame-resistance.

$CH_3$—Si—$(O$-nonyl$)_3$ is mentioned as a Si compound.

JA-60-186 559 (currently, only the abstract has been translated) discloses polycarbonate resins which contain potassium phosphonates, aromatic phosphites, 4,4-diydroxydiphenylalkane homo-oligomers or co-oligomers and organic Si compounds. The polycarbonate resins are flame-resistant. Methyl-tri-sec-octyloxysilane, tetranonyl silicate and tetratridecyl silicate are mentioned as Si compounds.

The 3 patent specifications mentioned above disclose that in order to achieve flame-resistant properties, at least the combination of an organic potassium phosphate and a trans-esterification catalyst (a phosphite) is required, that the silicon compound may optionally be omitted (data referring to amounts in claim 1, examples 1 to 4 in JA 60-186 559), and that a satisfactory effect is not produced without the transesterification catalyst. It is known, however, that transesterification catalysts, especially phosphites, have an unfavourable effect on polycarbonates, in particular they cause a deterioration in their resistance to hydrolysis and in electrical applications can also lead to contact damage due to the release of phosphoric acids. In all the examples, moreover, chlorine or bromine-containing phosphates are used, wherein a person skilled in the art knows that organic chlorine and bromine compounds on their own have quite a strong flame-resistant effect. The silicon compounds described, which are characterised by a methyl group and large alkoxy groups being bonded to the silicon, have further disadvantages, however, such as increased cloudiness of the polycarbonate and increased volatility caused by the low degree of compatibility.

Surprisingly, it has now been found that, by using special silicon compounds, flame-resistant polycarbonate moulding compositions with an extremely favourable combination of properties can be prepared, which are distinguished in that highly transparent, flame-resistant moulded items can be produced without using phosphorus, chlorine or bromine containing flameproofing agents. In particular, the flame-resistant effect of the silicon compounds according to the invention is manifested without using additional transesterification catalysts which lead to unwanted impairment of the material properties. The silicon compounds according to the invention are characterised by surprisingly low volatility, despite their relatively low boiling points.

Thermoplastic, aromatic polycarbonates in the context of the present invention are both homopolycarbonates and also copolycarbonates, the polycarbonates being linear or branched in a known way.

Some, up to 80-mol %, preferably from 20 mol-% to 50 mol-% of the carbonate groups in suitable polycarbonates according to the invention may be replaced by aromatic dicarboxylate groups. This type of polycarbonate which contains both acid radicals from carbonic acid and acid radicals from aromatic dicarboxylic acids incorporated in the molecular chain are called, more accurately, aromatic polyestercarbonates. For the sake of simplicity, they will all be included under the expression thermoplastic, aromatic polycarbonates, in the present patent application.

Polycarbonates to be used according to the invention are prepared in known ways from diphenols, carbonic acid derivatives, optionally chain stoppers and optionally branching agents, wherein, to prepare polyestercarbonates, some of the carbonic acid derivatives are replaced by aromatic dicarboxylic acids or derivatives of dicarboxylic acids, in fact by stipulating the carbonate structural units in the aromatic polycarbonates to be replaced by aromatic dicarboxylate structural units.

Details relating to preparing polycarbonates have been given in hundreds of patent specifications over the last 40 years. By way of example, reference is made here only to Schnell, "Chemistry and Physics of Polycarbonates", Polymer Reviews, vol. 9, Interscience Publishers, New York, London, Sydney 1964, to D.C. PREVORSEK, B. T. DEBONA and Y. KESTEN, Corporate Research Center, Allied Chemical Corporation, Morristown, N.J. 07960, "Synthesis of Poly(ester)carbonate Copolymers" in Journal of Polymer Science, Polymer Chemistry Edition, vol. 19, 75–90 (1980), to D. Freitag, U. Grigo, P. R. Müller, N. Nonvertue, BAYER AG, "Polycarbonates" in Encyclopedia of Polymer Science and Engineering, vol. 11, second edition, 1988, pages, 648–718 and finally to Drs. U. Grigo, K. Kricher and P. R. Müller "Polycarbonate" in Becker/ Braun, Kunststoff-Handbuch, vol. 3/1, Polycarbonate, Polyacetale, Polyester, Celluloseester, Carl Hanser Verlag, Munich, Vienna, 1992, pages 117–299.

The thermoplastic polycarbonates including thermoplastic, aromatic polyestercarbonates have average molecular weights $M_w$ (determined by measuring the relative viscosity at 25° C. in $CH_2Cl_2$ at a concentration of 0.5 g per 100 ml of $CH_2Cl_2$) of 12 000 to 120 000, preferably 18 000 to 80 000 and in particular 22 000 to 60 000.

Diphenols which are suitable for preparing polycarbonates to be used according to the invention are for example, hydroquinone, resorcinol, dihydroxydiphenyl, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, $\alpha,\alpha'$-bis-(hydroxyphenyl)-diisopropylbenzenes, and their ring-alkylated and ring-halogenated compounds.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-3,5-dimethyl-4-hydroxyphenyl)-2-methylbutane, 1,1-bis-(3,5-dimethyl-4-hydroxyphenyl)-p-diisopropylbenzene, dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and other suitable diphenols are described, for instance, in U.S. Pat. Nos. 3,028,635, 2,999,835, 3,148,172, 2,991,273, 3,271,367, 4,982,014 and 2,999,846, in German patent specifications 1 570 703, 2 063 050, 2 036 052, 2 211 956 and 3 832 396, in French patent specification 1 561 518, in the monograph "H.Schnell, Chemistry and Physics of Polycarbonates, Interscience Publishers, New York 1964" and in Japanese patent specifications 62039/1986, 62040/ 1986 and 105550/1986.

In the case of homopolycarbonates, only one diphenol is used, in the case of copolycarbonates several diphenols are used.

Suitable chain stoppers are either monophenols or monocarboxylic acids. Suitable monophenols are phenol itself, alkylphenols such as cresols, p-tert.-butylphenol, p-n-octylphenol, p-iso-octylphenol, p-n-nonylphenol and p-iso-nonylphenol, halogenated phenols such as p-chlorophenol, 2,4-dichlorophenol, p-bromophenol and 2,4,6-tribromophenol.

Suitable monocarboxylic acids are benzoic acid, alkyl-benzoic acids and halogenated benzoic acids.

Preferred chain stoppers are phenols of the formula (III)

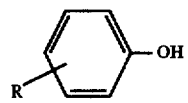

(III)

in which

R is a branched or linear $C_8$ and/or $C_9$-alkyl group.

The amount of chain stopper to be used is 0.5 mol-% to 10-mol-%, with respect to moles of the particular diphenols used. Addition of chain stoppers may take place before, during or after phosgenation.

Suitable branching agents are trifunctional or more than trifunctional compounds known from polycarbonate chemistry, in particular those with three or more than three phenolic OH groups.

Suitable branching agents are, for example, phloroglucine, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-orthoterephthalate, tetra-(4-hydroxyphenyl)-methane, tetra-(4-(4-hydroxyphenyl-isopropyl)-phenoxy)-methane and 1,4-bis-(4',4''-dihydroxytriphenyl)-methyl)-benzene and 2,4-dihydroxybenzoic acid, trimesic acid, cyanuric chloride and 3,3-bis-(3-methyl-4-hydroxyphenyl)-2-oxo-2,3-dihydroindole.

The amount of optionally used branching agent is 0.05 mol-% to 2 mol-%, again with respect to moles of the particular diphenols being used.

The branching agents may either be initially introduced with the diphenols and chain stoppers in the aqueous alkaline phase or be added before phosgenation, dissolved in an organic solvent.

All these features relating to preparing polycarbonates are common knowledge to a person skilled in the art.

Aromatic dicarboxylic acids suitable for preparing polyestercarbonates are, for example, orthophthalic acid, terephthalic acid, isophthalic acid, tert.butylisophthalic acid, 3,3'-diphenyldicarboxyic acid, 4,4'-diphenyl dicarboxylic acid, 4,4-benzophenone dicarboxylic acid, 3,4'-benzophenone dicarboxylic acid, 4,4'-diphenylether dicarboxylic acid, 4,4'-diphenylsulphone dicarboxylic acid, 2,2-bis-(4-carboxyphenyl)-propane, trimethyl-3-phenylindane-4,5'-dicarboxylic acid.

From among aromatic dicarboxylic acids, terephthalic acid and/or isophthalic acid are particularly preferably used.

Derivatives of dicarboxylic acids are the dihalides and dialkyl esters of dicarboxylic acids, in particular dicarboxylic dichlorides and dimethyl dicarboxylates.

The insertion of carbonate groups by aromatic dicarboxylate groups takes place essentially stoichiometrically and also quantitatively so that the molar ratio of the reaction partners is also repeated in the final polyestercarbonate. Incorporation of aromatic dicarboxylate groups may take place both randomly and in blocks.

Preferred methods of preparing the polycarbonates to be used according to the invention, including polyestercarbonates, are the known interfacial method and the known melt transesterification method.

In the first case phosgene is preferably used as the carbonic acid derivative, in the second case diphenyl carbonate is preferably used as the carbonic acid derivative. Catalysts, solvents, working up, reaction conditions, etc. for the preparation of polycarbonates have been adequately described in both cases and are well known.

a) Suitable alkali metal and/or alkaline earth metal salts in the context of the invention are, for example, the salts of inorganic protonic acids. Inorganic protonic acids in the context of the invention are Brönsted acids which can form alkali metal or alkaline earth metal salts (for the term "Brönsted acids" see Fieser & Fieser "Organic Chemistry", 1965, p. 595, Interscience publishers N.Y., USA) such as e.g. sulphuric acid, hydrofluoric acid, hydrochloric acid, hydrobromic acid, meta, ortho or pyro phosphoric acid and protonic acids of complex fluorinated metal compounds. The following may be used, for example, as this type of alkali metal or alkaline earth metal salts of complex fluorinated metal compounds:

hexafluoroaluminates hexafluorotitanates hexafluoroantimonates hexafluorosilicates hexafluorotungstates hexafluorozirconates hexafluorophosphates tetrafluoroborates.

Suitable alkali metal or alkaline earth metal salts of organic acids are, in the context of the invention, those of organic Brönsted acids with at least one carbon atom which can form alkali metal or alkaline earth metal salts.

This type of optionally substituted organic acid may be an OH or NH acidic compound such as, for example, carboxylic acids, sulphonic acids, phosphonic acids, thiophosphonic acids, NH acid sulphonamides or sulphonimides, mono or polyfunctional phenols or alcohols. They must have at least one carbon atom and may contain preferably between 2 and 30 carbon atoms.

Suitable alkali metal or alkaline earth metal salts of organic Brönsted acids are also salts from the following classes of substances:

Phosphate or thiophosphate salts with the general structures (IV) and (V)

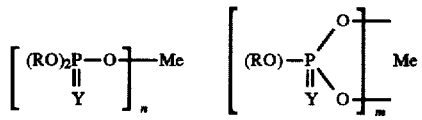

(IV) Y = O or S        (V) Y = O or S where, if Me=alkali metal, n=1 and m=2; if Me=alkaline earth metal, n=2 and m=1, R=a $C_1$–$C_{20}$-alkyl, cycloalkyl, $C_2$–$C_{20}$-alkenyl, cycloalkenyl or $C_6$–$C_{18}$-aryl group, wherein the aryl group may optionally be substituted by 1 to 5 halogen atoms such as F, Cl or Br, by CN, $CF_3$ or $C_1$–$C_{18}$-alkyl or cycloalkyl or $C_2$–$C_{18}$-alkenyl or cycloalkenyl groups.

Suitable alkali metal or alkaline earth metal salts in the context of the invention may also be those with the general structure (VI):

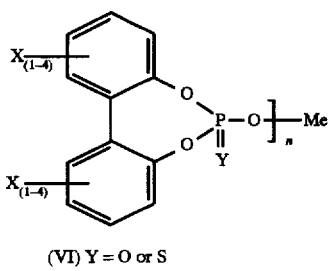

(VI) Y = O or S where
Me=alkali metal and n=1
Me=alkaline earth metal and n=2
X=F, Cl, CBr, CN, CF$_3$.

Furthermore, alkali metal or alkaline earth metal salts of phosphonates with the general structure (VII) may be used:

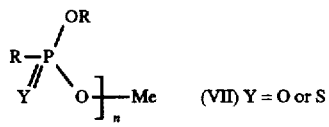

(VII) Y = O or S where
Me=alkali metal and n=1
Me=alkaline earth metal and n=2
R=R in structure (IV) or (V)

Suitable alkali metal salts are Li, Na and K salts. Suitable alkaline earth salts are calcium salts.

Further suitable alkali metal and/or alkaline earth metal salts in the context of the invention are described, for example, in DE-OS 24 60 935, 24 60 944, 24 60 945, 24 60 946, 24 61 145, 25 35 261, 25 35 262, 25 35 263, 26 31 756, 26 43 256, 26 44 114, 26 45 415, 26 46 120, 26 47 271, 26 48 131, 26 53 327, 26 48 128, 27 44 015, 27 44 016, 27 44 017, 27 44 018, 27 45 592, 27 46 906.

Preferred salts are alkali metal salts and of these, the Li, Na and K salts.

Li, Na and K salts which do not contain elements from the group consisting of chlorine, bromine and phosphorus are particularly preferred.

Alkali metal and alkaline earth metal salts suitable in accordance with a) should preferably have a pH between 5 and 9, in particular between 6.5 and 7.5., measured in 1 wt. % strength solutions or suspensions of the salts in water at 20° C.

The following may be mentioned as alkali metal salts of organic acids:
sodium or potassium perfluorobutane sulphate
sodium or potassium perfluoromethane sulphonate
sodium or potassium 2,5-dichlorobenzene sulphate
sodium or potassium 2,4,5-trichlorobenzene sulphate
sodium or potassium methyl phosphonate
sodium or potassium (2-phenyl-ethylene) phosphonate
sodium or potassium pentachlorobenzoate
sodium or potassium 2,4,6-trichlorobenzoate
sodium or potassium 2,4-dichlorobenzoate
lithium phenyl phosphonate
sodium or potassium diphenylsulphone sulphonate
sodium or potassium 2-formylbenzene sulphonate
sodium or potassium (N-benzenesulphonyl)-benzene sulphonamide The following may be mentioned as alkali metal salts of inorganic acids:
trisodium or tripotassium hexafluoroaluminate
disodium or dipotassium hexafluorotitanate
disodium or dipotassium hexafluorosilicate
disodium or dipotassium hexafluorozirconate
sodium or potassium pyrophosphate
sodium or potassium metaphosphate
sodium or potassium tetrafluoroborate
sodium or potassium hexafluorophosphate
sodium or potassium or lithium phosphate.

Particularly suitable salts are:
sodium or potassium perfluorobutane sulphonate
potassium hexafluoroaluminate
sodium hexafluoroaluminate
potassium diphenylsulphone sulphonate
sodium 2-formylbenzene sulphonate
sodium (N-benzenesulphonyl)-benzene sulphonamide Mixtures of the salts with each other are also suitable.

The silicon compounds according to the invention are known per se and may be prepared by conventional methods described in the literature (see, for example, Houben-Weyl, Methoden der Organischen Chemie, vol. XIII/5, Organo-Silicium-Verbindungen, Georg Thieme Verlag Stuttgart, New York, 1980, p. 199 et seq.).

Preferred examples of silicon compounds of the formula (I) are octyl-trimethoxysilane, octyl-triethoxysilane, i-octyl-trimethoxysilane, i-octyl-triethoxysilane, (2,4,4-trimethyl-pentyl)-trimethoxysilane, (2,4,4-trimethyl-pentyl)-triethoxysilane, tetradecyl-trimethoxysilane, tetradecyl-triethoxysilane, hexadecyl-trimethoxysilane, hexadecyl-triethoxysilane, octadecyl-trimethoxysilane, octadecyl-triethoxysilane, phenyl-trimethoxysilane, phenyl-triethoxysilane, diphenyl-dimethoxysilane, diphenyl-diethoxysilane, triphenyl-methoxysilane, triphenyl-ethoxysilane, benzyl-trimethoxysilane, benzyl-triethoxysilane, (2-phenyl-ethyl)-trimethoxysilane, (2-phenyl-ethyl)-triethoxysilane, (2-phenyl-propyl)-trimethoxysilane or (2-phenyl-propyl)-triethoxysilane. Particularly preferred are: octyl-trimethoxysilane, octyl-triethoxysilane, hexadecyl-trimethoxysilane, hexadecyl-triethoxysilane, diphenyl-dimethoxysilane or diphenyl-diethoxysilane.

The salts in accordance with a) and the silicon compounds in accordance with b) may be added to the polycarbonates either successively or simultaneously, during synthesis of the polycarbonates or after synthesis of the polycarbonates. This can be performed, for example, by mixing the polycarbonates with additives a) and b) at room temperature and then melt compounding at 260° C. to 360° C., preferably at 260° C. to 300° C., or then melt extruding at 250° to 320° C., preferably at 260° C. to 290° C.

Moulding compositions according to the invention may also be prepared in solution, by adding salts in accordance with a) and silicon compounds in accordance with b), simultaneously or successively, to the polycarbonates, dissolved in a polycarbonate solvent, and then evaporating down the polycarbonate solution or pouring out the polycarbonate solution to form films.

The present invention thus also provides a method for preparing polycarbonate moulding compositions according to the invention which is characterised in that the polycarbonates are mixed with the salts in accordance with component a) and with the silicon compounds in accordance with component b), either simultaneously or successively, either in bulk or in solution, and then the mixture is either melt compounded at temperatures between 260° C. and 360°

C. or melt extruded at temperatures between 250° C. and 320° C., or the polycarbonate solutions are evaporated and the mixture obtained is granulated, or the polycarbonate solutions, optionally after concentrating, are poured out to form films.

Polycarbonate moulding compositions according to the invention may also contain conventional additives such as glass fibres, fillers, pigments, UV stabilisers, antioxidants and mould release agents, in the amounts which are conventional for thermoplastic polycarbonates.

The invention thus also provides polycarbonate moulding compositions according to the invention which are characterised in that they also contain, in addition to the added components a) and b), at least one additive selected from the group: glass fibres, fillers, pigments, UV stabilisers, antioxidants and mould release agents.

These conventional additives may be added in a known manner together with components a) and/or b) or afterwards to the polycarbonates being made flame-resistant.

The invention thus also provides an extension to the process according to the invention, characterised in that at least one additive, selected from glass fibres, fillers, pigments, UV stabilisers, antioxidants and mould release agents, is added together with components a) and/or b) or afterwards to the polycarbonates being made flame-resistant.

Polycarbonate moulding compositions according to the invention may be processed using known methods, under the conditions conventional for polycarbonate, to give flameproof moulded items and films.

The moulding compositions are suitable for injection moulded and extruded articles on which are placed high specifications with respect to flame-resistance.

The moulded items may be used, for instance, in the electrical, electronics, construction, vehicle and/or aircraft sectors.

EXAMPLES

Data relating to amounts, expressed as wt. %, are given with reference to the weight of the entire mixture.

Examples 1 to 5

An aromatic polycarbonate made from 2,2-bis-(4-hydroxyphenyl)-propane (melt flow index 8, measured according to DIN 53 735) with phenol as chain stopper was melted at 280° C. in a double shaft extruder. A mixture of 0.1 wt. % of potassium perfluorobutane sulphonate and 0.5 wt. % of silicon compound was then fed directly to the polycarbonate melt. The polymer extrudate was dried at 80° C. in a vacuum drying cabinet and sprayed in an injection moulding machine at 280° C. to form test specimens with the dimensions 127×12×2.6 mm.

10 each of the test rods were then subjected to a flammability test in accordance with the UL 94 instructions (flammability of solid plastics samples, Underwriter Laboratories).

The cloudiness was calculated according to ASTM-D 1003 from the standard colour values measured according to DIN 5033, using colour test specimens with the dimensions 60×40×4 mm.

To test for volatility, the silicon content in a UL 94 test rod was determined by dissolving in morpholine/CCl₄ and measuring the Si line at 288.15 nm in an emission spectrometer (DCP emission spectrometer model SS-7 DCP, from ARL).

| No. | Si compound | mol. weight | UL 94 | Cloudiness % | Si content ppm |
|---|---|---|---|---|---|
| 1 | octyl-triethoxysilane | 276 | 10 × V0 | 4.6 | 169 |
| 2 | diphenyl-dimethoxysilane | 244 | 10 × V0 | 3.9 | 334 |
| 3 Comp. | methyl-tri-nonyloxysilane | 472 | 8 × V0 2 × V2 | 7 | 98 |
| 4 Comp. | 3-glycidoxy-propyl-trimethoxysilane | 236 | 4 × V0 1 × V1 5 × V2 | not known | not known |
| 5 Comp. | tetra-(butoxyethoxy)-silane | 496 | 7 × V0 1 × V1 2 × V2 | not known | 148 |

The Si compounds according to the invention are highly effective without any transesterification catalysts, show high transparency and are less volatile, despite their lower molecular weights, than, for instance, the compound used in example 3.

Examples 6 to 8

An aromatic polycarbonate made from 2,2-bis-(4-hydroxyphenyl)-propane (melt flow index 2, measured according to DIN 53 735) with phenol as a chain stopper was melted at 280° C. in a double shaft extruder. A mixture of 0.15 wt. % of potassium diphenylsulphone sulphonate and 0.25 wt. % of silicon compound (in comparison example 8, 0.5 wt. % of organic chlorinated compound instead of the Si compound) was then fed directly to the polycarbonate melt. The polymer extrudate was cooled and granulated. The granules were dried at 80° C. in a vacuum drying cabinet and sprayed in an injection moulding machine at 280° C. to form test specimens with the dimensions 127×12×2.4 mm.

10 each of the test rods were then subjected to a flammability test in accordance with the UL 94 instructions (flammability of solid plastics samples, Underwriter Laboratories).

| No. | Si compound | UL 94 |
|---|---|---|
| 6 | octyl-triethoxysilane | 10 × V0 |
| 7 | diphenyl-dimethoxysilane | 10 × V0 |
| 8 Comp. | hexamethylene-bis-tetrachlorophthalimide | 10 × V0 |

The Si compounds according to the invention confer high flame-resistance even on thin-walled moulded items and achieve the effectiveness of organochlorine compounds, despite being used in smaller amounts.

Examples 9 to 11

A structurally viscous aromatic polycarbonate made from 2,2-bis-(4-hydroxyphenyl)-propane (melt flow index 2 to 3, measured according to DIN 53 735) with phenol as a chain stopper and 3,3-bis-(3-methyl-4-hydroxyphenyl)-2-oxo-2,3-dihydroindole as a branching agent was melted at 280° C. in a double shaft extruder. A mixture of 0.15 wt. % of potassium diphenylsulphone sulphonate and 0.25 wt. % of silicon compound (in comparison example 11, 0.5 wt. % of organic chlorinated compound instead of the Si compound) was then fed directly to the polycarbonate melt. The polymer extrudate was cooled and granulated. The granules were dried at 80° C. in a vacuum drying cabinet and sprayed in an injection moulding machine at 280° C. to form test specimens with the dimensions 127×12×2.4 mm.

10 each of the test rods were then subjected to a flammability test in accordance with the UL 94 instructions (flammability of solid plastics samples, Underwriter Laboratories).

| No. | Si compound | UL 94 |
|---|---|---|
| 9 | octyl-triethoxysilane | 10 × V0 |
| 10 | diphenyl-dimethoxysilane | 10 × V0 |
| 11 Comp. | hexamethylene-bis-tetrachlorophthalimide | 10 × V0 |

The Si compounds according to the invention confer high flame-resistance even on thin-walled moulded items and achieve the effectiveness of organochlorine compounds, despite being used in smaller amounts.

We claim:

1. A polycarbonate moulding composition consisting of a thermoplastic aromatic polycarbonate, having an average molecular weight $\overline{M}_w$ of 18,000 to 80,000 wherein said polycarbonate is derived from a diphenol selected from the group consisting of hydroquinone, resorcinol, dihyroxydiphenyl, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, $\alpha,\alpha'$-bis-(hydroxyphenyl)-diisopropylbenzenes, and their ring-alkylated compounds, and a) potassium perfluorobutane sulphonate or potassium diphenylsulphone sulphonate in amounts of 0.001 weight % to 1 weight % and b) octyl triethoxysilane or diphenyl dimethoxysilane in amounts of 0.01 weight % to 10 weight %, each being with respect to the weight of the thermoplastic aromatic polycarbonate for both component a) and component b), and, optionally, at least one additive selected from the group consisting of glass fibers, fillers, pigments, UV-stabilizers, antioxidants and mould release agents.

2. The moulding composition as claimed in claim 1, wherein the additive is present.

3. A process for preparing the polycarbonate moulding composition as claimed in claim 1, consisting of mixing the polycarbonate with potassium perfluorobutane sulphonate or potassium diphenylsulphone sulphonate and with octyl triethoxysilane or diphenyl dimethoxysilane, either sucessively or simultaneously, either in bulk or in solution, and subsequently melt compounding the mixture at temperatures between 260° and 360° C., wherein at least one additive selected from the group consisting of glass fibres, fillers, pigments, UV stabilisers, antioxidants and mould release agents is optionally added to the polycarbonate together with components a), b) or a mixture thereof, or afterwards.

4. A process for preparing the polycarbonate moulding composition as claimed in claim 1, consisting of mixing the polycarbonate with potassium perfluorobutane sulphonate or potassium diphenylsulphone sulphonate and with octyl triethoxysilane or diphenyl dimethoxysilane, either sucessively or simultaneously, either in bulk or in solution, and melt extruding the mixture at temperatures between 250° and 320° C., wherein at least one additive selected from the group consisting of glass fibres, fillers, pigments, UV stabilisers, antioxidants and mould release agents is optionally added to the polycarbonate together with components a), b) or a mixture thereof, or afterwards.

5. A process for preparing the polycarbonate moulding composition as claimed in claim 1, consisting of mixing the polycarbonate with potassium perfluorobutane sulphonate or potassium diphenylsulphone sulphonate and with octyl triethoxysilane or diphenyl dimethoxysilane, either sucessively or simultaneously, either in bulk or in solution, and evaporating the mixture followed by granulating the mixture, wherein at least one additive selected from the group consisting of glass fibres, fillers, pigments, UV stabilisers, antioxidants and mould release agents is optionally added to the polycarbonate together with components a), b) or a mixture thereof, or afterwards.

6. A process for preparing the polycarbonate moulding composition as claimed in claim 1, consisting of mixing the polycarbonate with potassium perfluorobutane sulphonate or potassium diphenylsulphone sulphonate and with octyl triethoxysilane or diphenyl dimethoxysilane, either sucessively or simultaneously, either in bulk or in solution, and pouring the mixture to form a film, optionally after concentrating the mixture, and wherein at least one additive selected from the group consisting of glass fibres, fillers, pigments, UV stabilisers, antioxidants and mould release agents is optionally added to the polycarbonate together with components a), b) or a mixture thereof, or afterwards.

* * * * *